United States Patent
Marking

(10) Patent No.: US 9,416,841 B2
(45) Date of Patent: Aug. 16, 2016

(54) COOLER FOR A SUSPENSION DAMPER

(71) Applicant: Fox Factory, Inc., Scotts Valley, CA (US)

(72) Inventor: John Marking, El Cajon, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

(21) Appl. No.: 14/293,805

(22) Filed: Jun. 2, 2014

(65) Prior Publication Data

US 2014/0262646 A1    Sep. 18, 2014

Related U.S. Application Data

(63) Continuation of application No. 13/411,086, filed on Mar. 2, 2012.

(60) Provisional application No. 61/449,045, filed on Mar. 3, 2011.

(51) Int. Cl.
*F16F 9/42* (2006.01)

(52) U.S. Cl.
CPC ........................ *F16F 9/42* (2013.01)

(58) Field of Classification Search
USPC .......... 188/266.2, 266.5, 274, 275, 315, 318; 267/64.15, 64.16
See application file for complete search history.

(56) References Cited

U.S. PATENT DOCUMENTS

| | | | |
|---|---|---|---|
| 3,277,985 A | 10/1966 | Caskey | |
| 3,795,291 A | 3/1974 | Naito et al. | |
| 4,206,935 A | 6/1980 | Sheppard et al. | |
| 4,616,810 A | 10/1986 | Richardson et al. | |
| 4,743,000 A | 5/1988 | Karnopp | |
| 4,786,034 A | 11/1988 | Heess et al. | |
| 5,208,749 A * | 5/1993 | Adachi et al. | 701/38 |
| 5,222,759 A | 6/1993 | Wanner et al. | |
| 8,763,770 B2 | 7/2014 | Marking | |
| 2002/0008339 A1 * | 1/2002 | Ogura | 267/64.16 |
| 2007/0051573 A1 | 3/2007 | Norgaard et al. | |
| 2009/0314592 A1 | 12/2009 | Nygren | |
| 2010/0170760 A1 | 7/2010 | Marking | |
| 2011/0214956 A1 | 9/2011 | Marking | |
| 2011/0315494 A1 | 12/2011 | Marking | |
| 2012/0018263 A1 | 1/2012 | Marking | |

* cited by examiner

*Primary Examiner* — Christopher Schwartz

(57) ABSTRACT

A method and apparatus are disclosed for cooling damping fluid in a vehicle suspension damper unit. A damping unit includes a piston mounted in a fluid cylinder. A bypass fluid circuit having an integrated cooling assembly disposed therein is fluidly coupled to the fluid cylinder at axial locations that, at least at one point in the piston stroke, are located on opposite sides of the piston. The cooling assembly may include a cylinder having cooling fins thermally coupled to an exterior surface of the cylinder and made of a thermally conductive material. The bypass channel may include a check valve that permits fluid flow in only one direction through the bypass channel. The check valve may be remotely operated, either manually or automatically by an electronic controller. A vehicle suspension system may implement one or more damper units throughout the vehicle, controlled separately or collectively, automatically or manually.

12 Claims, 7 Drawing Sheets

COOLER FOR A SUSPENSION DAMPER

CROSS-REFERENCE TO RELATED APPLICATIONS

This application is a continuation application of and claims priority to and benefit of co-pending U.S. patent application Ser. No. 13/411,086, filed on Mar. 2, 2012, which claims benefit of U.S. Provisional Patent Application Ser. No. 61/449,045, filed Mar. 3, 2011, which is herein incorporated by reference in its entirety. Embodiments of this application may be used with embodiments of U.S. Provisional Patent Application Ser. No. 61/296,826, filed Jan. 20, 2010, U.S. patent application Ser. No. 12/684,072, filed Jan. 7, 2010, and U.S. patent application Ser. No. 13/010,697, filed Jan. 20, 2011, each of which is herein incorporated by reference in its entirety.

BACKGROUND OF THE INVENTION

1. Field of the Invention

The invention relates generally to vehicle suspensions and, more specifically, to a cooler assembly for a suspension damper.

2. Description of the Related Art

Vehicle suspension systems typically include a spring component or components and a damping component or components. Typically, mechanical springs, like helical springs, are used with some type of viscous fluid-based damping mechanism, the spring and damper being mounted functionally in parallel. In some instances, features of the damper or spring are user-adjustable, such as by adjusting the air pressure in a gas spring. A damper may be constructed by placing a vented damping piston in a fluid-filled cylinder. As the damping piston is pushed into the cylinder, fluid is compressed and passes slowly through the vents in the piston, which are often covered by shim stacks to provide for different operational characteristics in compression or extension.

One disadvantage with conventional damping components is that thermal variations in operating conditions can cause the damping characteristics of the damping components to change. The environment that the damping components are operated in can vary widely, from arctic conditions on snowmobiles to desert conditions on off-road vehicles. Even within a given environment, the temperature fluctuation can change wildly during different parts of the day. Furthermore, as the damping components are subject to repetitive cycles, such as when a truck is being driven over rough terrain in the desert, the oil contained within the damping cylinder may heat up due to work performed on the oil by the damping piston. As the oil heats up, the viscosity of the oil will decrease, thereby allowing oil to flow more easily through the vented damping piston. Similarly, heat from nearby engine components may also contribute to the temperature of the oil. At high temperatures, such as greater than 400° F., the heat can lead to a degradation of rubber sealing elements within the damping components that could cause permanent damage to the vehicle suspension as oil is no longer sealed within the damping components.

As the foregoing illustrates, what is needed in the art are improved techniques for controlling operating temperatures of a suspension damper.

SUMMARY OF THE INVENTION

One embodiment of the present disclosure sets forth a vehicle suspension damper that includes a cylinder containing a piston assembly comprising a piston and piston rod, a working fluid within the cylinder, a passageway through the piston allowing and limiting a flow rate of the working fluid through the piston in at least one direction, and a bypass channel comprising a fluid pathway between a first side of the piston and a second side of the piston. The bypass channel includes a cooling chamber disposed within the fluid pathway.

Yet another embodiment of the present disclosure sets forth a vehicle suspension system that includes one or more of the vehicle suspension dampers, set forth above.

One advantage of some disclosed embodiments is that the viscous fluid in the suspension damper is continuously circulating through the cooling chamber during the stroking of the piston, thereby transferring excess heat to the air surrounding the cooling chamber. This continuous cycle helps to keep the fluid temperature at levels that will not harm the damping components.

DETAILED DESCRIPTION

Integrated damper/spring vehicle shock absorbers often include a damper body surrounded by or used in conjunction with a mechanical spring or constructed in conjunction with an air spring or both. The damper often consists of a piston and shaft telescopically mounted in a fluid filled cylinder. The damping or working fluid may be, for example, hydraulic oil. A mechanical spring may be a helically wound spring that surrounds or is mounted in parallel with the damper body. As used herein, the terms "down" "up" "downward" upward" "lower" "upper" and other directional references are relative and are used for reference only.

Figure 1:
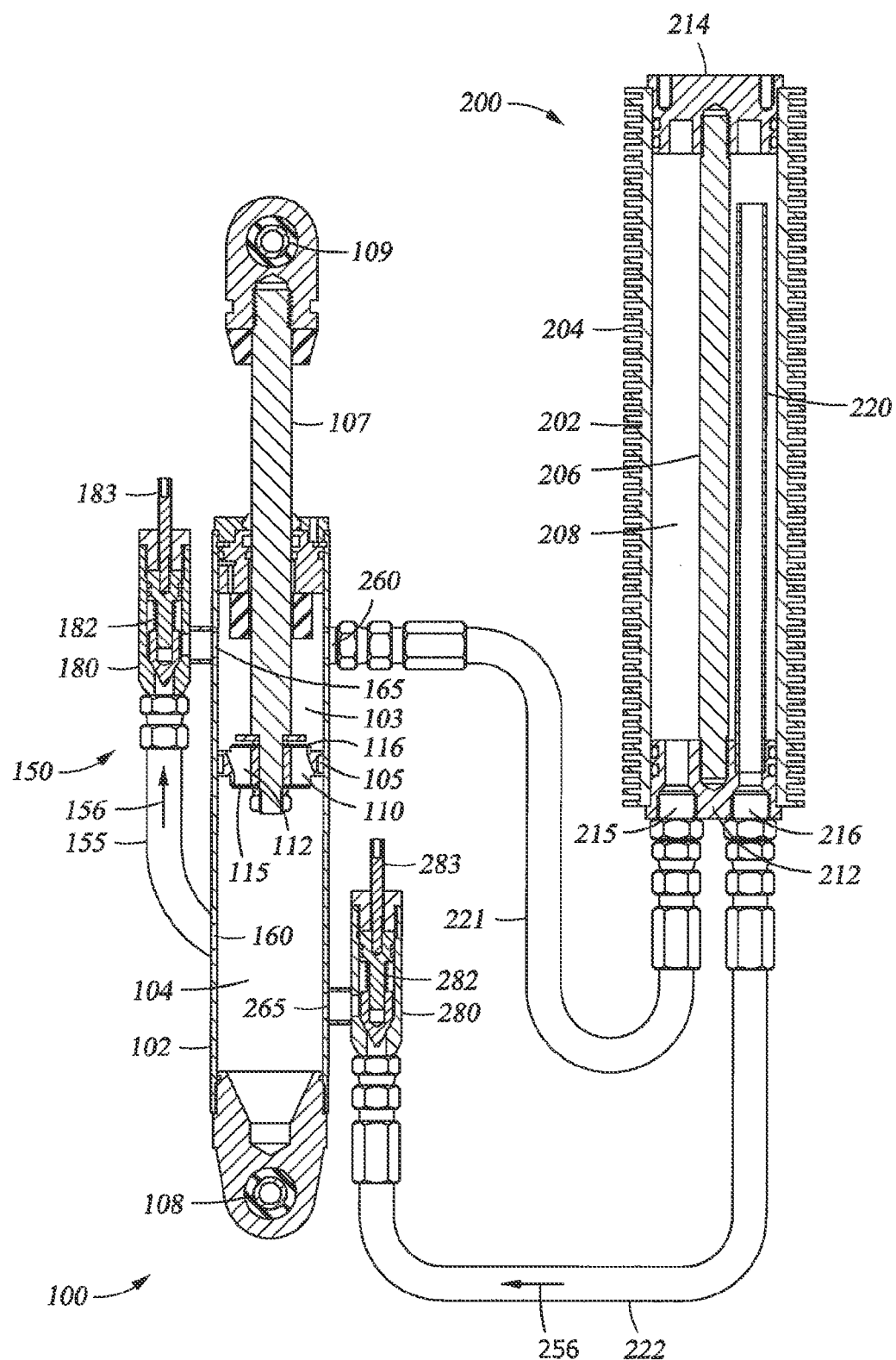
FIG. 1 is a sectional side elevation view of a suspension damping unit, according to one example embodiment.

FIG. 1 is a sectional side elevation view of a suspension damping unit 100, according to one example embodiment. The damper includes a cylinder 102 with a rod 107 and a piston 105. In one embodiment, the damping fluid meters, from one side to the other side of piston 105, by passing through flow paths 110, 112 formed in the piston 105. In the embodiment shown, shims 115, 116 are used to partially obstruct the flow paths 110, 112 in each direction. By selecting shims 115, 116 having certain desired stiffness characteristics, the damping effects can be increased or decreased and damping rates can be different between the compression and rebound strokes of the piston 105. For example, shims 115 are configured to meter rebound flow from the rebound portion 103 of the cylinder 102 to the compression portion 104 of the cylinder 102. Shims 116, on the other hand, are configured to meter compression flow from the compression portion 104 of the cylinder 102 to the rebound portion 103 of the cylinder 102. In one embodiment, shims 116 are not included on the rebound portion side, rather the compression flow path 110 is absent, leaving the piston essentially "locked out" in the compression stroke without some means of flow bypass (e.g., damping fluid must bypass the piston 105 rather than traverse ports in the piston 105). Note that piston apertures (not shown) may be included in planes other than those shown (e.g. other than apertures used by paths 110 and 112) and further that such apertures may, or may not, be subject to the shims 115, 116 as shown (because for example, the shims 115, 116 may be clover-shaped or have some other non-circular shape).

The upper portion of the rod 107 (opposite the piston 105) may be supplied with an eyelet 109 to be mounted to one part of the vehicle, while the lower part of the damping unit 100 is shown with an eyelet 108 that may be attached to another portion of the vehicle, such as the frame, that moves independently of the first part. A spring member (not shown) is often mounted to act between the same portions of the vehicle as the damper. As the rod 107 and piston 105 move into cylinder 102 (during compression), the damping fluid slows the movement of the two portions of the vehicle relative to each other due to the incompressible fluid moving through the shimmed path 110 (past shims 116) provided in the piston 105 and/or through a bypass path 156 via the metered bypass assembly 150, as will be described herein. As the rod 107 and piston 105 move out of the cylinder 102 (during extension or "rebound"), fluid meters through shimmed path 112, and/or a fluid bypass, and the flow rate and corresponding rebound rate is controlled by corresponding shims 115 or other flow restriction mechanisms.

In one embodiment as shown in FIG. 1, a bypass assembly 150 is designed to permit damping fluid to travel from a first side of the piston to the other side without traversing shimmed flow path 110 that may otherwise be traversed in a compression stroke of the damper. The bypass assembly 150 includes a tubular body 155 that is fluidly coupled with the damper cylinder 102 through bypass entry aperture 160 and bypass exit aperture 165. The flow of fluid through the bypass assembly 150 is shown by bypass path 156. A needle-type throttle and check valve 180 (hereinafter "check valve 180" or "throttle/check valve 180", used interchangeably herein), allowing flow in one direction and checking flow in the opposite direction, is located proximate to bypass exit aperture 165. The check valve 180 sets flow resistance through the bypass assembly 150 during the compression stroke and restricts fluid from entering the bypass assembly 150 during the rebound stroke of the damper piston 105. In one embodiment, the check valve 180 is spring loaded and biased closed. The initial compression force of the biasing spring 182 is adjusted via adjuster 183 thereby allowing a user to preset the needle valve opening pressure and hence the compression damping fluid flow rate through the bypass assembly 150. The biasing force of the needle valve spring 182 is overcome by fluid pressure in the tubular body 155 causing the throttle/check valve 180 to open against the spring during a compression stroke.

The bypass entry aperture 160 is located towards a lower end of the damper cylinder 102 (i.e., the end of the damper cylinder 102 proximate the piston 105 towards the end of the compression stroke). In one embodiment, as selected by design, the bypass assembly 150 will not operate after the piston 105 passes the bypass entry aperture 160 near the end of a compression stroke or located elsewhere in the stroke as desired. This "piston position sensitive" feature ensures increased damping will be in effect near the end of the compression stroke to help prevent the piston from approaching a "bottomed out" position (e.g. impact) in the cylinder 102. In some instances, multiple bypasses are used with a single damper and the entry pathways for each may be staggered axially along the length of the damper cylinder 102 in order to provide an ever-increasing amount of damping (and less fluid flow through the bypass assembly 150) as the piston 105 moves through its compression stroke and towards the top of the damping cylinder 102. Certain bypass damper features are described and shown in U.S. Pat. Nos. 6,296,092 and 6,415,895, each of which is incorporated herein, in its entirety, by reference.

In one embodiment, the bypass assembly 150 includes a fluid (e.g. hydraulic or pneumatic) fitting disposed at an end of the check valve 180, described below in conjunction with FIGS. 4-6. The fluid fitting is intended to carry a control signal in the form of fluid pressure to the valve 180 in order to adjust the needle valve opening pressure of the check valve 180. Thus, the throttle/check valve 180 may be adjusted by remote control from a simple operator-actuated switch located in the passenger compartment of the vehicle. As such, an operator may remotely control the throttle opening and hence bypass pressure, thereby controlling the stiffness of the damper. In one embodiment, fluid pressure for controlling the check valve 180 is provided by the vehicle's own source of pressurized hydraulic fluid created by, for example, the vehicle power steering system. In another embodiment, pneumatic pressure is used to control the check valve 180 where the pneumatic pressure is generated by an on-board compressor and accumulator system and conducted to the check valve 180 via a fluid conduit. In yet another embodiment, a linear electric motor (e.g. solenoid), or other suitable electric actuator, is used, in lieu of fluid pressure, to manipulate and adjust the check valve 180 preload. In such electrical embodiments, the solenoid is wired (e.g. via electrical conduit) into the vehicle electrical system and switched, for example, in the operator cockpit to adjust the check valve 180.

As also shown in FIG. 1, damping unit 100 also includes a second bypass path 256 operable in a rebound stroke of the piston 105. It is noteworthy that the second bypass could operate in the compression stroke, the rebound stroke, or both the compression and rebound strokes, depending on the configuration of the check valve 180 or omission thereof. In one embodiment, the second bypass path 256 comprises a cooling assembly 200 that comprises a cylinder body 202, a lower seal 212 and an upper seal 214 connected by a connecting rod 206. The lower seal 212 may be threaded onto the connecting rod 206 and slid into the lower end of the cylinder body 202. The upper seal 214 may then be threaded onto the upper end of the connecting rod 206 to form a fluid reservoir 208 inside the cylinder body 202. The lower seal 212 includes a fluid inlet port 215 and a fluid outlet port 216 allowing damping fluid to pass from the rebound portion 103 of the cylinder 102, through the cylinder body 202 of the cooling assembly 200, and back to the compression portion 104 of the cylinder 102. The lower seal 212 and upper seal 214 may form a fluid-tight seal against the inner surface of the cylinder body 202 using one or more sealing elements such as a rubber o-ring. A plurality of radial cooling fins 204 may be formed on the outer surface of the cylinder body 202, which increases the external surface area of the cylinder body 202, thereby increasing the heat transfer effectiveness of the cooling assembly 200. In one embodiment, the cooling fins 204 may be made from a material having good thermal conductivity such as, for example, aluminum or copper, or alloys thereof. In another embodiment, the cylinder body 202 is made from a material having good impact resistance, strength, and fatigue life such as aluminum or aluminum alloys. The cylinder 202 and cooling fins 204 may be constructed from a single piece of material or may be an assembly of multiple parts constructed from separate pieces and/or types of materials having the same or suitable desired properties such as thermal conductivity, strength, and toughness.

The fluid inlet port 215 is fluidly coupled with the rebound portion 103 of the cylinder 102 through a cooling entry aperture 260 in cylinder 102. The fluid outlet port 216 is fluidly coupled with the compression portion 104 of the cylinder 102 through a cooling exit aperture 265 in cylinder 102. The cooling entry aperture 260 and the cooling exit aperture 265 may be positioned axially near the top and bottom of cylinder 102, respectively. In one embodiment, the cooling assembly 200 may be connected to the cylinder 102 via flexible hydraulic hoses 221, 222 and hydraulic fittings. In another embodiment, the cooling assembly 200 may be connected to the cylinder 102 via hydraulic tubes made of rigid material such as stainless steel or aluminum. Although shown proximate to damping unit 100, in some embodiments, cooling assembly 200 may be located remotely from the damping unit 100, such as near a fan by an air intake for a vehicle.

A needle-type throttle and check valve 280 (hereinafter "check valve 280" or "throttle/check valve 280", used interchangeably herein), allowing metered flow in one direction and checking flow in the opposite direction, is located proximate to cooling exit aperture 265. In one embodiment, the check valve 280 is similar to check valve 180 in the bypass assembly 150 and sets flow resistance through the cooling assembly 200 during the rebound stroke and restricts fluid from entering the cooling assembly 200 during the compression stroke of the piston 105. In one embodiment, the check valve 280 is spring loaded and biased closed. The initial compression force of the biasing spring 282 is adjusted via valve adjuster 283 thereby allowing a user to preset the needle valve opening pressure and hence the rebound damping fluid flow rate through the cooling assembly 200. The biasing force of the needle valve spring 282 is overcome by fluid pressure in the hydraulic hose 222 causing the check valve 280 to open during a rebound stroke.

Figure 4:
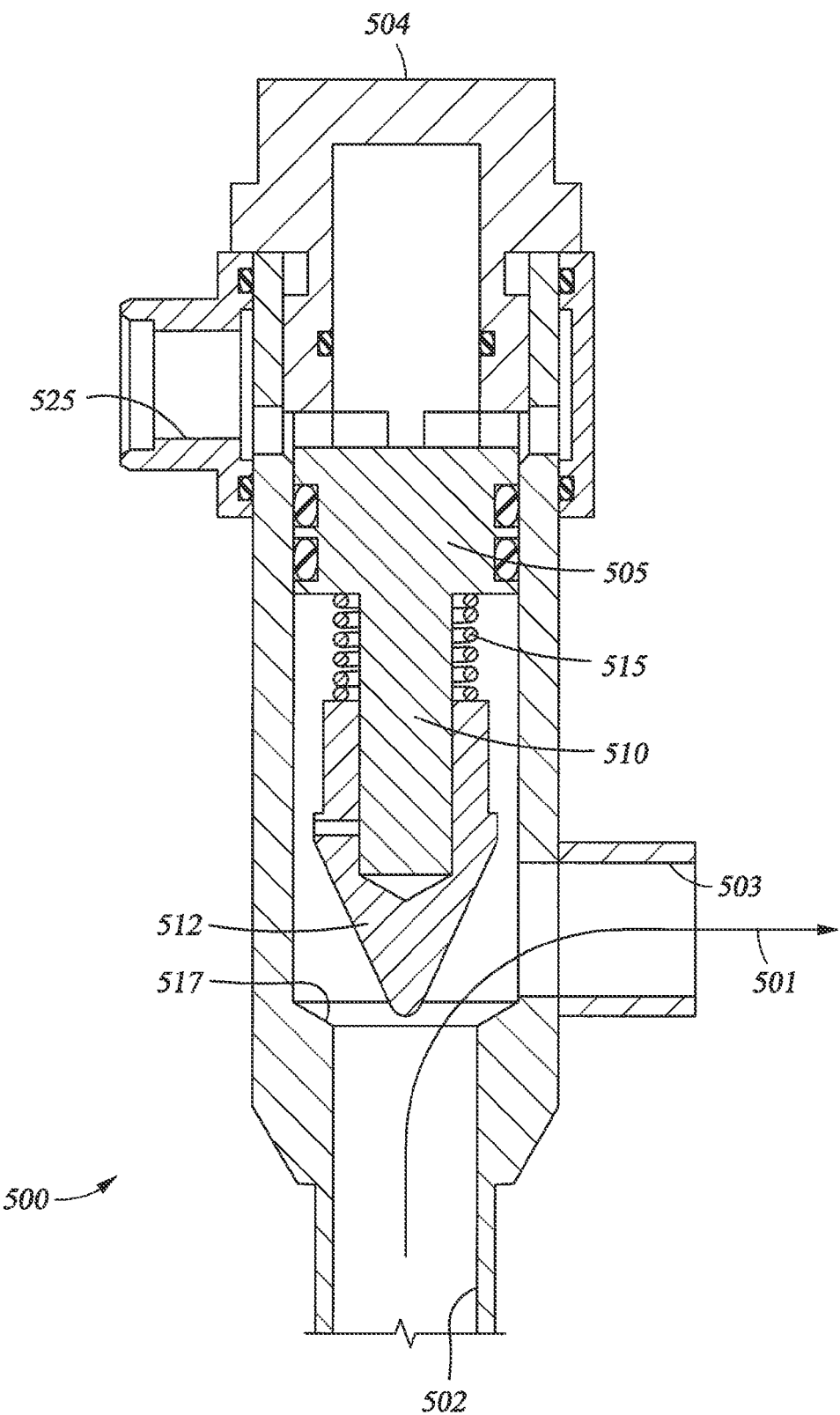
FIGS. 4, 5, and 6 are enlarged views showing a remotely operable needle valve in various positions, according to some example embodiments.
Figure 5:
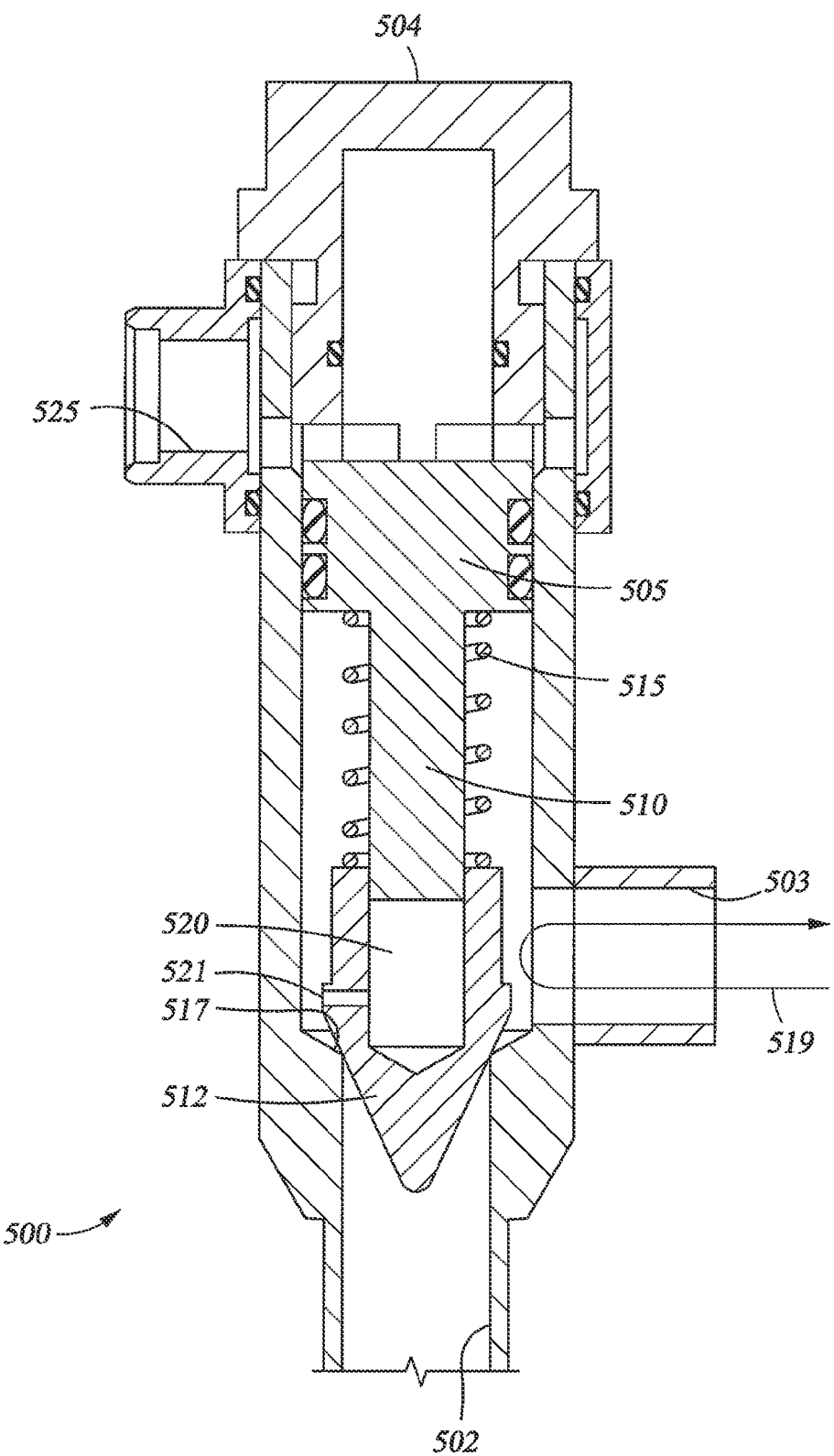
Figure 6:
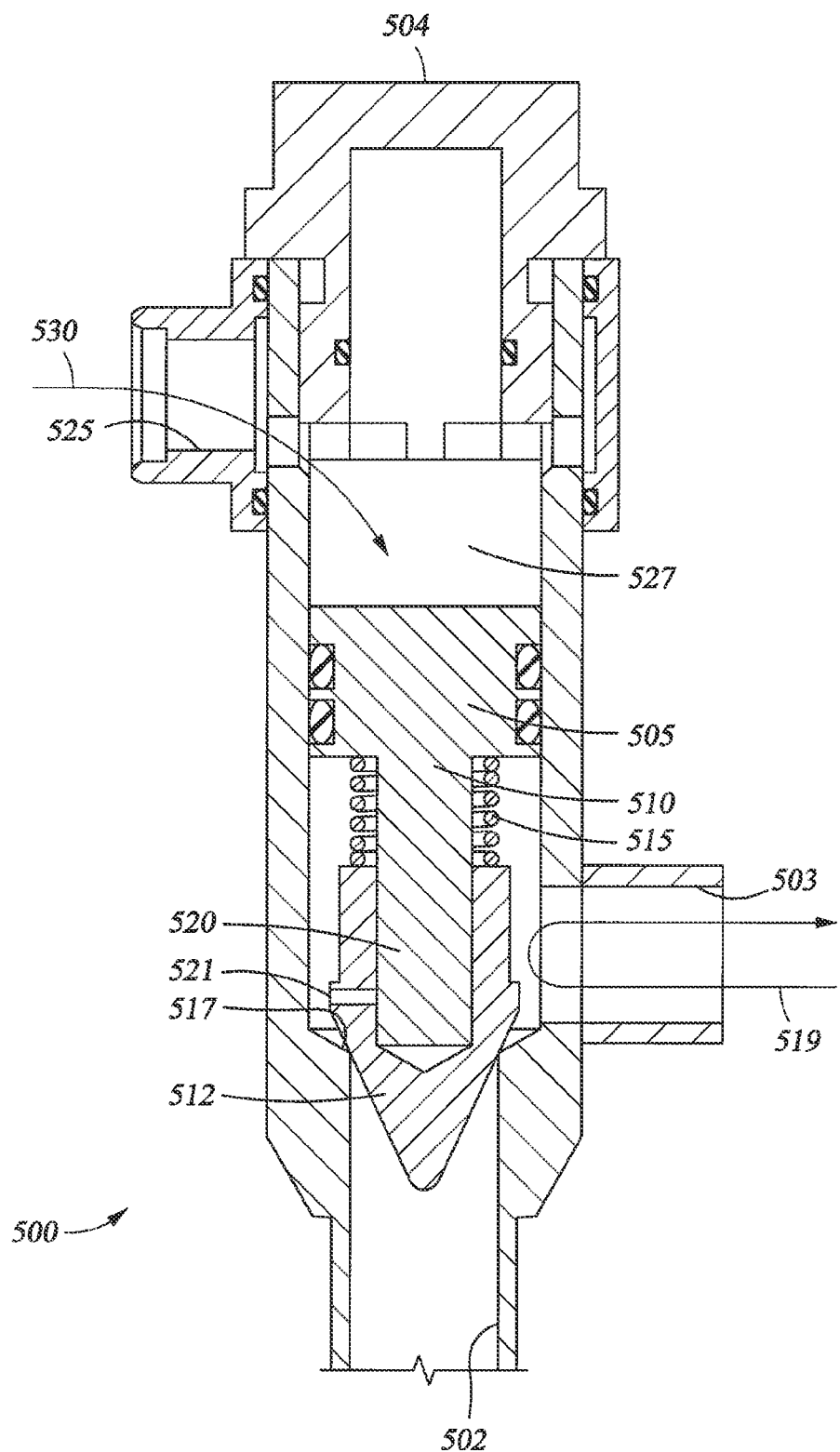

In one embodiment, the cooling assembly 200 includes a fluid (e.g. hydraulic or pneumatic) fitting disposed at an end of the check valve 280, as shown in FIGS. 4-6. The fluid fitting is intended to carry a control signal in the form of fluid pressure to the valve adjuster 283 in order to adjust the needle valve opening pressure of the check valve 280. The check valve 280 may be adjusted by remote control from a simple operator-actuated switch located in the passenger compartment of the vehicle. Alternatively, the check valve 280 may be controlled automatically by an electronic control module or a thermostat configured to monitor the temperature of the damping fluid and decrease the needle valve opening pressure via valve adjuster 283 when the temperature is above a threshold temperature to increase fluid flow through the cooling assembly 200 or increase the needle valve opening pressure via valve adjuster 283 when the temperature is below a threshold temperature to decrease fluid flow through the cooling assembly 200. Operation of the check valve 280 may be generally as described in relation to check valve 180.

In one embodiment, the fluid outlet port 216 is fluidly coupled to the fluid reservoir 208 formed in the cylinder body 202 by a tube 220 that forces fluid that flows through the fluid outlet port 216 to be drawn from the far end of the cylinder body 202, opposite the end of the cylinder body 202 that includes both the fluid inlet port 215 and the fluid outlet port 216. By forcing fluid to be drawn from a point at the far end of the cylinder body 202, hot fluid that enters the cylinder body 202 at the fluid inlet port 215 will transfer heat to the cylinder body 202 that is dissipated via convection over the cooling fins 204. Thus, fluid drawn down through the tube 220 is cooler than fluid that enters the cylinder body 202 at the fluid inlet port 215. The tube 220 may be insulated to prevent hot fluid entering the cylinder body 202 at the fluid inlet port 215 from transferring heat to the fluid leaving the cylinder body 202 through the fluid outlet port 216. In another embodiment, the tube 220 may be coupled to the fluid inlet port 215 such that fluid entering the cylinder body 202 must first flow through the tube 220 to the far end of the cylinder body 202. In this embodiment, there is no tube connected to the fluid outlet port 216 such that cooler fluid at the bottom of the cylinder body 202 exits through the fluid outlet port 216.

In operation, damping unit 100 may be compressed, where piston 105 is forced towards the lower end of the cylinder body 102. The fluid pressure in the compression portion 104 of the cylinder body 102 increases as piston 105 moves into the cylinder body 102. Consequently, fluid is forced through the flow path 110 and past shims 116 into the rebound portion 103 of the cylinder body 102. If the fluid pressure in the compression portion 104 of the cylinder body 102 is larger than the needle valve opening pressure of check valve 180, then fluid may also flow into the rebound portion 103 of the cylinder body 102 via the bypass assembly 150. It will be noted that, in one embodiment, check valve 280 prevents fluid from flowing from the compression portion 104 of the cylinder body 102 through the cooling exit aperture 265 and into the cooling assembly 200. Once damping unit 100 has reached the end of the compression stroke, the piston 105 reverses direction and begins the rebound stroke as the damping unit 100 returns to an uncompressed state.

During the rebound stroke, the fluid pressure in the rebound portion 103 of the cylinder body 102 increases as piston 105 moves up through the cylinder body 102. Fluid is forced through flow path 112 and shims 115 into the compression portion 104 of the cylinder body 102. If the fluid pressure in the rebound portion 103 of the cylinder body 102 is larger than the needle valve opening pressure of check valve 280, then fluid may also flow from the rebound portion 103 of the cylinder body 102 into the cooling assembly 200 via hydraulic hose 221 and into the compression portion 104 of the cylinder body 102 via the hydraulic hose 222. As the fluid passes through cylinder body 202 of the cooling assembly 200, heat from the fluid is transferred to the air surrounding the cooling assembly 200.

It will be appreciated that the effectiveness of the cooling assembly 200 is dependent on the external surface area of the cylinder 202. Therefore, in order to increase the effectiveness of the cooling assembly 200, the length of the cylinder 202 may be adjusted to match the heat transfer specification for a given application. For example, a short cylinder body 202 may be effective in temperate climates whereas a long cylinder body 202 may be effective in a desert environment. In some embodiments, the cooling assembly 200 may be configured to work during the compression stroke of piston 105 rather than the rebound stroke by switching the locations of the cooling inlet port 260 and the cooling outlet port 265.

In one embodiment, the damper unit 100 includes only one bypass circuit comprising a cooler assembly 200 as described herein, where the bypass circuit includes no check valve, and where the piston 105 further omits fluid paths 110, 112 therein such that all damping fluid is forced to flow through the cooler assembly 200 during both the compression stroke and the rebound stroke. In some embodiments, one or both of check valves 180 and 280 may not be included. In such embodiments, the size of entry apertures 160, 260 and exit apertures 165, 265 may be designed to restrict the amount of fluid flow through the bypass assembly 150 or the cooling assembly 200. In other embodiments, one or both of check valves 180 and 280 may be replaced with a non-adjustable check valve that allows fluid flow in only one direction via a fixed cracking pressure (Le the minimum upstream pressure differential at which the valve will operate).

Figure 2:
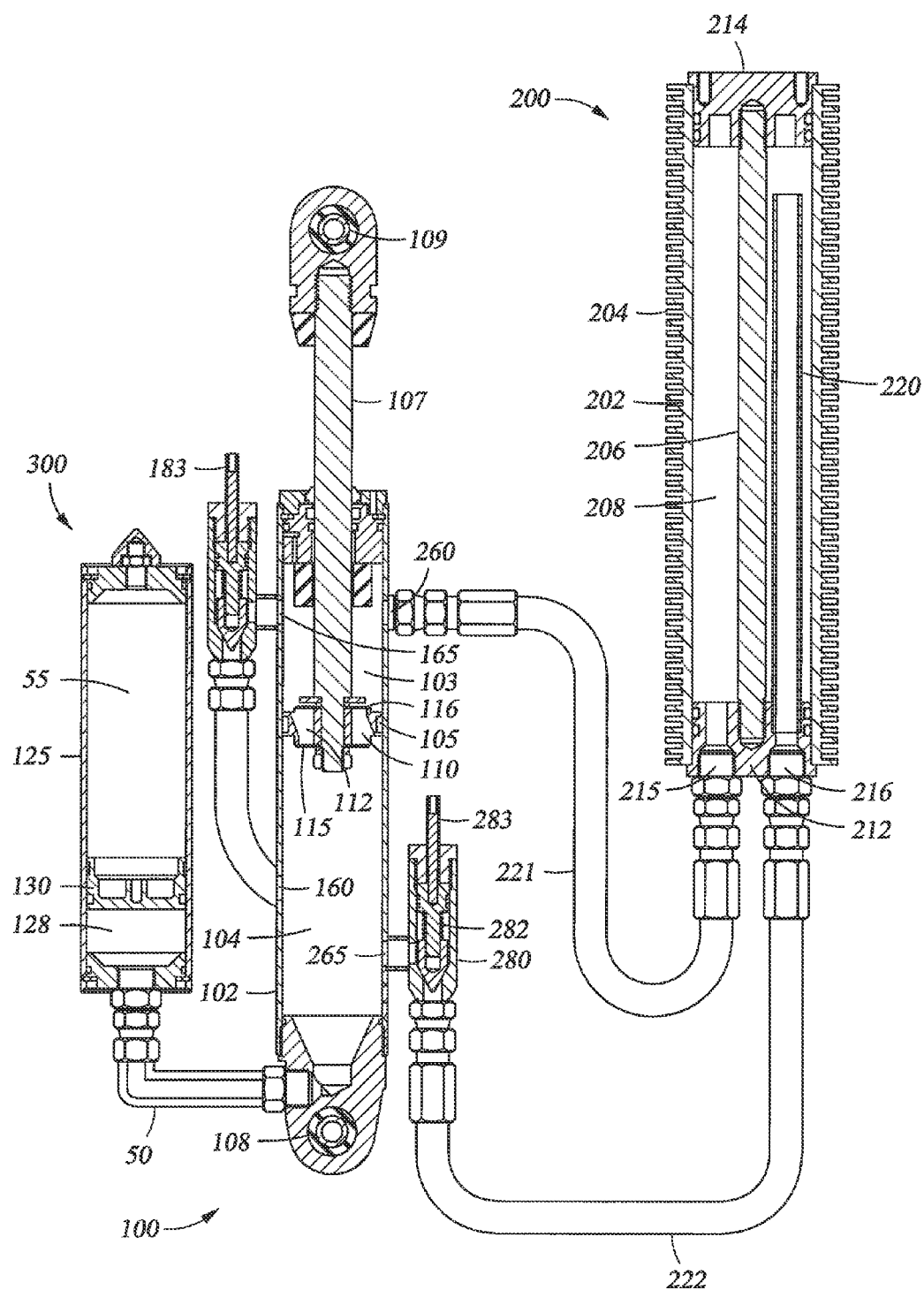
FIG. 2 is a sectional side elevation view of a suspension damping unit that implements an integrated reserve fluid reservoir, according to another example embodiment.

FIG. 2 is a sectional side elevation view of a suspension damping unit 100 that implements an integrated reserve fluid reservoir 300, according to another example embodiment. The reserve fluid reservoir 300 stores damping fluid in a reservoir portion 128 of a reservoir cylinder 125 that is in fluid communication with the compression portion 104 of the cylinder 102. The reservoir 300 receives and supplies reserve damping fluid as rod 107 moves in and out of the cylinder 102, accounting for the small change in volume of the damping fluid caused by the intrusion of the rod 107 into the rebound portion 103 of the cylinder 102. The reservoir 300 includes a floating piston 130 moveably mounted within the cylinder 125, with a volume of gas 55 on a backside ("blind end") of the floating piston 130, the gas being compressible as the reservoir portion 128 of the cylinder 125 fills with fluid due to movement of the rod 107. Certain features of reservoir type dampers are shown and described in U.S. Pat. No. 7,374,028, which is incorporated herein, in its entirety, by reference. The reservoir portion 128 of the reservoir cylinder 125 is fluidly coupled to the compression portion 104 of the cylinder 102 via a tube 50 connected to a fluid port near the lower end of cylinder 102. For added cooling, an exterior surface of the reservoir 300 may include cooling fins as described herein generally in relation to the cooling bypass circuit.

Figure 3:
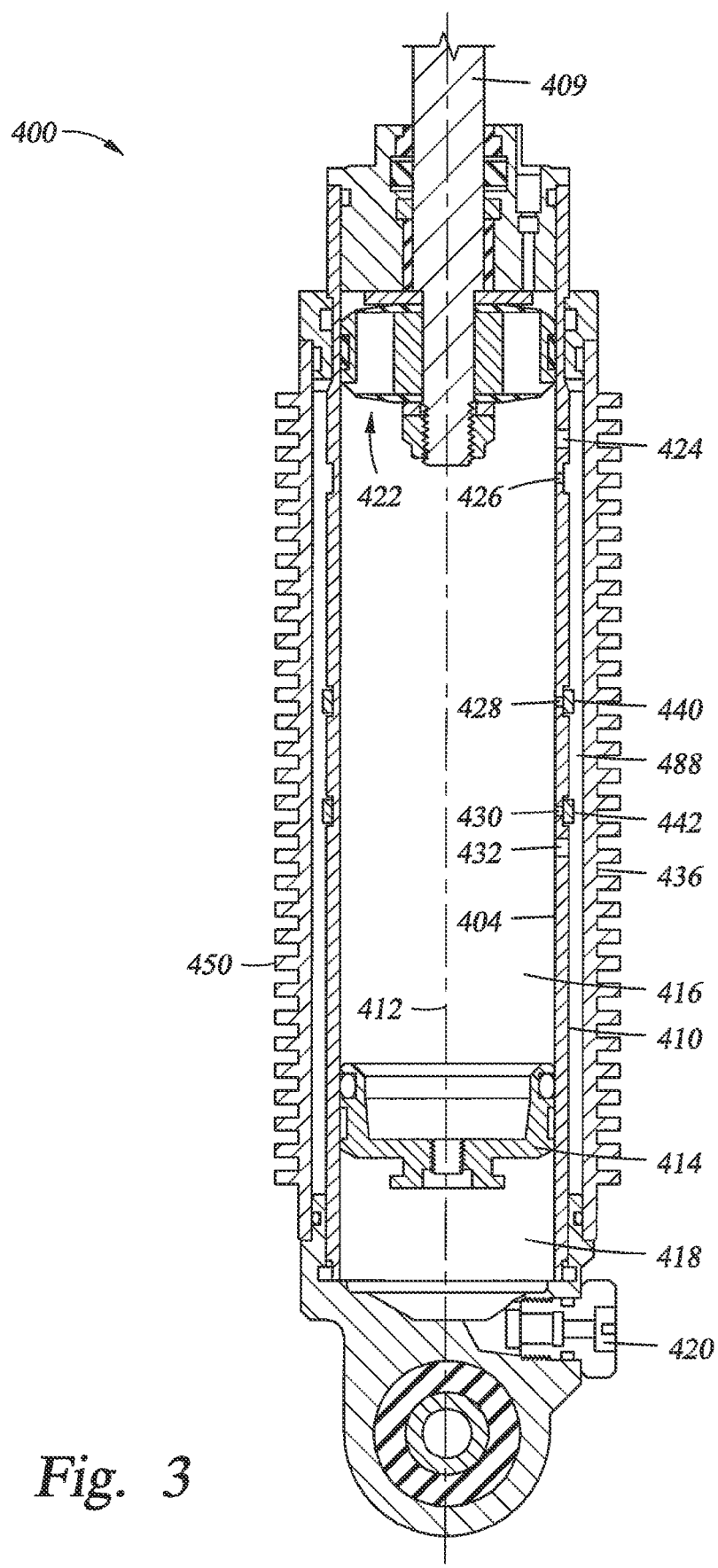
FIG. 3 is a sectional side elevation view of a suspension damping unit, according to yet another example embodiment.

FIG. 3 is a sectional side elevation view of a suspension damping unit 400, according to yet another example embodiment. As shown in FIG. 3, damping unit 400 is a position-sensitive shock absorber including a cylinder 404 having an interior 406, first and second ends 408, 410 and defining an axis 412. A floating piston 414 divides interior 406 into a damping fluid chamber 416 and a gas chamber 418. Gas chamber 418 can be pressurized through a pressurization port 420. Gas chamber 418 and floating piston 414 accommodate the volume of oil or other damping fluid within chamber 416 displaced by the movement of shaft 419 into the damping fluid chamber 416. A vented piston 422 is movably mounted within the cylinder 404 for moving between the first and second ends 408, 410 of the cylinder 404. A number of axially separated bypass openings 424, 426, 428, 430, 432 are formed through the cylinder 404. A bypass cylinder 436 surrounds cylinder 404 and defines a cylindrical bypass channel 438. Bypass openings 424, 426 and 432 are always open and fluidly couple the damping fluid chamber 416 and the bypass channel 438 to permit some damping fluid to bypass the vented damping piston 422 when the piston is positioned between these bypass openings thus reducing the damping during this portion of the stroke. In one embodiment, bypass openings 428, 430 are covered by expandable bands 440, 442 positioned within annular grooves formed in the outer surface of cylinder 404. Bands 440, 442 act as check valve elements that permit fluid flow from the damping fluid chamber 416 to the annular bypass channel 438 but restrict, and typically prevent, fluid flow in the opposite direction. Thus, the shock absorber will exhibit different damping characteristics along the same segment of the stroke depending upon whether the stroke is the compression stroke or the rebound stroke.

In one embodiment, cooling fins 450 are formed on an outer surface of the bypass cylinder 436. The cooling fins 450 may be made from a material exhibiting good thermal conductivity such as copper or aluminum, as well as alloys thereof. Damping fluid passing through the bypass channel 438 is cooled as heat from the damping fluid is transferred to air flowing over the cooling fins 450 of the bypass cylinder 436. The cooler damping fluid is then circulated back into the damping fluid chamber 416 through bypass openings 424, 426, and 432.

FIGS. 4, 5, and 6 are enlarged views showing a remotely operable needle valve 500 in various positions, according to some example embodiments. In some embodiments, valve 500 may be used in place of check valve 180 or check valve 280 to provide a remote-operation capability to the bypass channels of damping unit 100. In FIG. 4, the valve 500 is in a damping-open position (fluid path shown by arrow 501) permitting the bypass channel to operate and let fluid flow through the bypass channel. The valve 500 includes a valve body 504 housing a movable piston 505 which is sealed within the body. Three fluid communication points are provided in the body including an inlet 502 and outlet 503 for fluid passing through the valve 500 as well as an inlet 525 for control fluid as will be described herein. Extending from a first end of the piston 505 is a shaft 510 having a cone-shaped member 512 (other shapes such as spherical or flat, with corresponding seats, will also work suitably well) disposed on an end thereof. The cone-shaped member 512 is telescopically mounted relative to, and movable on, the shaft 510 and is biased in an extended position (FIG. 5) due to a spring 515 coaxially mounted on the shaft 510 between the member 512 and the piston 505. Due to the spring biasing, the cone-shaped member 512 normally seats itself against a seat 517 formed in an interior of the body 504. In the damping open position shown however, fluid flow through the bypass has provided adequate force on the member 512 to urge it backwards, at least partially loading the spring 515 and creating fluid path 501 from the bypass channel into the damper cylinder as shown in FIG. 1. The characteristics of the spring 515 are typically chosen to permit the valve 500 (e.g. member 512) to open at a predetermined bypass pressure, with a predetermined amount of control pressure applied to inlet 525. For a given spring 515, higher control pressure at inlet 525 will result in higher bypass pressure required to open the valve 500 which decreases fluid flow through the bypass channel. In one embodiment, the valve 500 is open in both directions when the valve piston 505 is "topped out" against valve body 504. In another embodiment however, when the valve piston 505 is abutted or "topped out" against valve body 504 the spring 515 and relative dimensions of the valve 500 still allow for the cone member to engage the valve seat thereby closing the valve. In such embodiment backflow through the bypass channel is always substantially closed and cracking pressure from fluid flow through the bypass channel is determined by the pre-compression in the spring 515. In such an embodiment, additional fluid pressure may be added to the inlet through port 525 to increase the cracking pressure of valve 500 and thereby decrease fluid flow through the bypass channel over that value provided when the spring 515 is "topped out." It is generally noteworthy that some or all of the bypass channels (or channel) on a given suspension unit may be configured to allow or restrict both compression damping and rebound damping bypass.

FIG. 5 shows the valve 500 in a closed position (which it assumes during a rebound stroke of the damper). As shown in FIG. 5, the cone shaped member 512 is seated against seat 517 due to the force of the spring 515 and absent an opposite force from fluid entering the valve along the bypass channel. As member 512 telescopes out, a gap 520 is formed between the end of the shaft 510 and an interior of member 512. A vent 521 is provided to relieve any pressure formed in the gap. With the fluid path 501 closed, fluid communication is substantially shut off from the bypass channel into the valve body and a "dead-end" path is shown by arrow 519 which prevents fluid from flowing into the bypass channel.

Inlet 525 is formed in the valve body 504 for operation of the valve. In one embodiment inlet 525 may be pressurized to shift the valve 500 to a third or "locked-out" position. In FIG. 6, the valve 500 is shown in the locked-out position, thereby preventing fluid flow through the bypass channel in either direction, regardless of whether the damping unit 100 is in a compression stroke or a rebound stroke. In the embodiment shown, the control inlet 525 provides a fluid path 530 to a piston surface 527 formed on an end of the piston 505, opposite the cone-shaped member 512. Specifically, activating pressure is introduced via inlet 525 to move the piston 505 and with it, member 512 toward seat 517. Sufficient activating pressure fully compresses the spring 515 (substantial stack out) and/or closes the gap 520 thereby closing the cone 512 against the seat 517, sealing the bypass channel to both compression flow in one direction and rebound flow in the other direction. In the embodiment shown, the valve 500 can be shifted to the third, locked-out position from either the first, open position or the second, closed position. Note that, when in the "locked out" position, the valve 500 as shown will open to fluid flow through the bypass channel when the fluid flow pressure acting over the surface area of the seated valve cone 512 exceeds the inlet 525 pressure acting over the surface area of the piston 505. Such inlet 525 pressure may be selected to correspond to a desired overpressure relief value or "blow off" value, thereby allowing fluid to flow through the bypass channel under "extreme" conditions even when the bypass is "locked out".

The valve 500 is intended to be shifted to the locked-out position with control fluid acting upon piston 505. In one embodiment, the activating pressure via inlet 525 is adjusted so that the valve 500 is closed to fluid flowing through the bypass channel in one direction (e.g., opposite bypass paths 156, 256) but with the spring 515 not fully compressed or stacked out. In such a position, a high enough fluid force (e.g. fluid pressure in the bypass channel) will still open the valve 500 and allow fluid to pass through the valve 500. In one arrangement, the activating pressure, controlled remotely, may be adjusted between levels where the lock-out is not energized and levels where the lock-out is fully energized. The activating pressure may also be adjusted at intermediate levels to create more or less fluid flow through the bypass channel. The activating pressure may be created by hydraulic or pneumatic input or any other suitable pressure source.

In one example, the valve 500 is moved to a locked-out position and the bypass feature (i.e., compression bypass or cooling bypass) of the damping unit 100 is disabled by remote control from a simple operator-actuated switch located in the passenger compartment of the vehicle. In one embodiment, fluid pressure for controlling (e.g. locking-out) the valve 500 is provided by the vehicle's on-board source of pressurized hydraulic fluid created by, for example, the vehicle power steering system. In another embodiment, pneumatic pressure is used to control (e.g. close) the valve 500 where the pneumatic pressure is generated by an on-board compressor and accumulator system and conducted to the valve 500 via a fluid conduit. In yet another embodiment, a linear electric motor (e.g. solenoid), or other suitable electric actuator, is used, in lieu of the aforementioned inlet 525 pressure, to move the "piston" axially within valve body. A shaft of the electric actuator (not shown) may be fixed to the piston such that axial movement of the shaft causes axial movement of the piston which in turn causes movement of the cone 512 (and compression of the spring as appropriate). In such embodiments, the electric actuator is configured to "push" the piston towards a closed position and to "pull" the piston away from the closed position depending on the direction of the current switched through the actuator.

Figure 7:
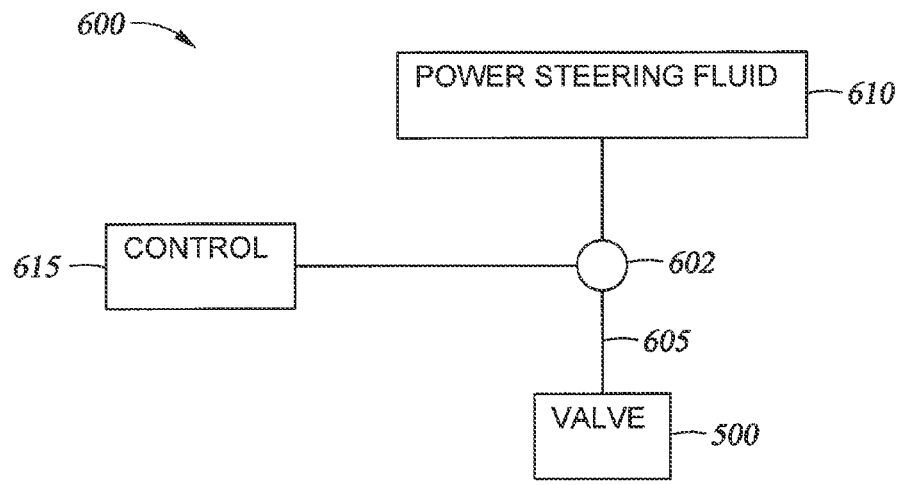
FIG. 7 is a schematic diagram illustrating a sample circuit used to provide remote control of a bypass valve using a vehicle's power steering fluid, according to one example embodiment.

FIG. 7 is a schematic diagram illustrating a sample circuit 600 used to provide remote control of a bypass valve 500 using a vehicle's power steering fluid (although any suitable fluid pressure source may be substituted for reservoir 610 as could an electrical current source in the case of an electrically actuated valve), according to one example embodiment. As illustrated in FIG. 7, a fluid pathway 605 having a control-operated valve 602 therein runs from a fluid (or current) reservoir 610 that is kept pressurized by, in one embodiment, a power steering pump (not shown) to a check valve 500 that is operable, for example, by a user selectable dash board control 615. The valve 502 permits fluid to travel to the inlet 525 of the check valve 500, thereby allowing a user or electronic controller to adjust the needle valve opening pressure of the valve 500. In one embodiment, the control 615 is a three position switch that allows a user to remotely set the needle valve opening pressure of the valve 500 by increasing or decreasing the pressure of fluid in pathway 605. In another embodiment, the control 615 is a rheostat that allows a user to set the pressure of fluid in pathway 605 via a linearly actuated pressure regulator 602 based on the position of the rheostat. While FIG. 7 is simplified and involves control of a single valve 500, it will be understood that the valve 502 could be plumbed to simultaneously provide a signal to two or more check valves 500 operable with two or more vehicle damping units and/or with a single damping unit having multiple valves 500. Additional switches could permit individual operation of separate damper check valves 500, whether on separate dampers or on the same damper, depending upon an operator's needs. While the example of FIG. 7 uses fluid power for operating the valve 500, a variety of means are available for remotely controlling a valve. For instance, a source of electrical power from a 12 volt battery could be used to operate a solenoid member. The signal can be either via a physical conductor or an RF signal (or other wireless such as Bluetooth, WiFi, ANT) from a transmitter operated by the controller 615 to a receiver operable on the valve 500.

While the examples illustrated relate to manual operation of the valve 500, other embodiments contemplate automated operation of valve(s) 500 based upon specific parameters. The remotely operated bypass assembly 150 and cooling assembly 200 check valves can be used in a variety of ways with many different driving and road variables. In one example, the bypass assembly 150 is controlled based upon vehicle speed in conjunction with the angular location of the vehicle's steering wheel. In this manner, by sensing the steering wheel turn severity (angle of rotation), additional damping can be applied to one damper or one set of dampers on one side of the vehicle (suitable for example to mitigate cornering roll) in the event of a sharp turn at a relatively high speed. In another example, a transducer, such as an accelerometer measures other aspects of the vehicle's suspension system, like axle force and/or moments applied to various parts of the vehicle, like steering tie rods, and directs change to the bypass valve 180 positioning in response thereto. In another example, the bypass valve 180 can be controlled at least in part by a pressure transducer measuring pressure in a vehicle tire and adding damping characteristics to some or all of the wheels in the event of, for example, an increased or decreased pressure reading. In one embodiment, the damper bypass assembly 150 or bypass channels (including, as desired, the cooling assembly 200 type bypass described herein) are controlled in response to braking pressure (as measured for example by a brake pedal sensor or brake fluid pressure sensor or accelerometer). In still another example, a parameter might include a gyroscopic mechanism that monitors vehicle trajectory and identifies a "spin-out" or other loss of control condition and adds/reduces damping to some or all of the vehicle's dampers in the event of a loss of control to help the operator of the vehicle to regain control. In still yet another example, the fluid flow rate through the cooling assembly 200 can be controlled, at least in part, based on the temperature of the damping fluid.

Figure 8:
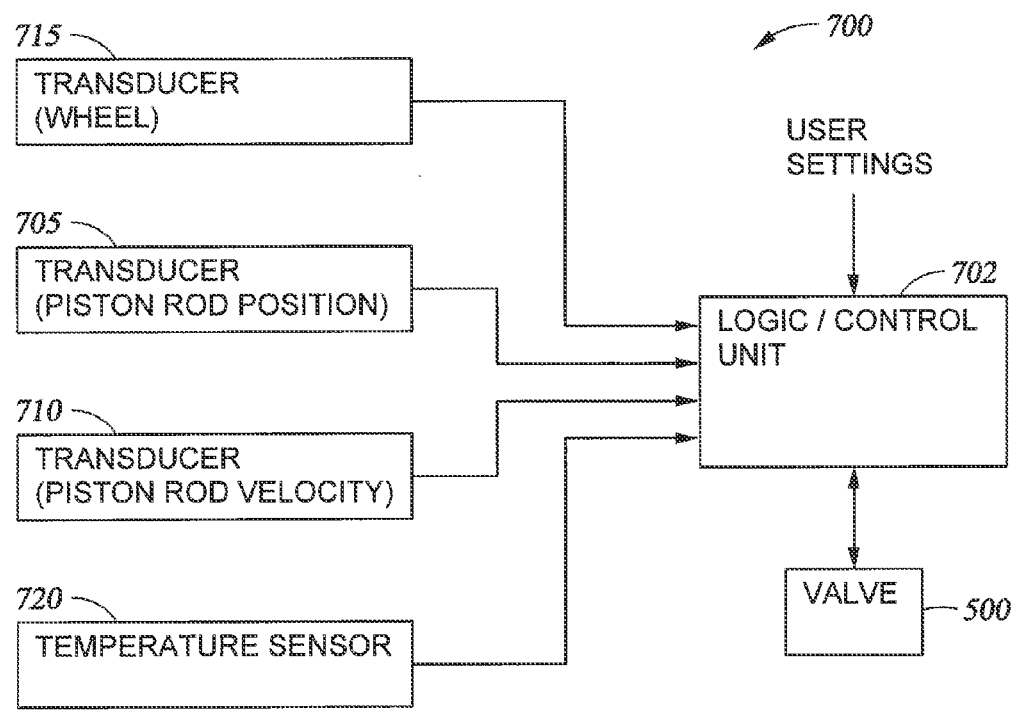
FIG. 8 illustrates a system for controlling the bypass channels based on four variables: rod speed, rod position, vehicle speed, and fluid temperature, according to one example embodiment.

FIG. 8 illustrates, for example, a system including four variables: rod speed, rod position, vehicle speed, and fluid temperature, according to one example embodiment. Any or all of the variables shown may be considered by processor 702 in controlling the valve 500. Any other suitable vehicle operation variable may be used in addition to or in lieu of the variables 705, 710, 715, and 720 such as for example piston rod compression strain, eyelet strain, vehicle mounted accelerometer data or any other suitable vehicle or component performance data. In one embodiment, a suitable proximity sensor or linear coil transducer or other electro-magnetic transducer is incorporated in the damping cylinder 102 to provide a sensor to monitor the position and/or speed of the piston 105 (and suitable magnetic tag) with respect to the cylinder 102. In one embodiment, the magnetic transducer includes a waveguide and a magnet, such as a doughnut (toroidal) magnet that is joined to the cylinder and oriented such that the magnetic field generated by the magnet passes through the piston rod and the waveguide. Electric pulses are applied to the waveguide from a pulse generator that provides a stream of electric pulses, each of which is also provided to a signal processing circuit for timing purposes. When the electric pulse is applied to the waveguide a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, either digital or analog, proportional to the calculated distance and/or velocity. Such a transducer-operated arrangement for measuring rod speed and velocity is described in U.S. Pat. No. 5,952,823, which is incorporated by reference herein in its entirety.

While a transducer assembly located at the damper measures rod speed and location, a separate wheel speed transducer for sensing the rotational speed of a wheel about an axle includes housing fixed to the axle and containing therein, for example, two permanent magnets. In one embodiment the magnets are arranged such that an elongated pole piece commonly abuts first surfaces of each of the magnets, such surfaces being of like polarity. Two inductive coils having flux conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118, which is incorporated by reference herein in its entirety.

In one embodiment, as illustrated in FIG. 8, a logic unit 702 with user-definable settings receives inputs from the rod speed 710 and location 705 transducers as well as the wheel speed transducer 715. The logic unit is user-programmable and depending on the needs of the operator, the unit records the variables and then if certain criteria are met, the logic circuit sends its own signal to the bypass assembly 150 to either close or open (or optionally throttle) the check valve 180. Thereafter, the condition of the bypass valve 180 is relayed back to the logic unit 702. In another embodiment, the logic unit 702 with user-definable settings receives inputs from the temperature sensor 720, and adjusts the control signal to the cooling assembly 200 to either close or open (or optionally throttle) the check valve 280. Thereafter, the condition of the check valve 280 is relayed back to the logic unit 702.

It will be appreciated that the logic shown in FIG. 8 assumes a single damper but the logic circuit is usable with any number of dampers or groups of dampers. For instance, the dampers on one side of the vehicle can be acted upon while the vehicles other dampers remain unaffected.

The foregoing embodiments, while shown in configurations often corresponding to off-road truck shock absorbers, are equally applicable to bicycle or motorcycle shocks or front forks or other vehicle shock absorbers. While the foregoing is directed to embodiments of the present disclosure, other and further embodiments may be implemented without departing from the scope of the disclosure, the scope thereof being determined by the claims that follow.

The invention claimed is:

1. A vehicle suspension damper comprising:
a cylinder containing a piston assembly comprising a piston and piston rod;
a working fluid within the cylinder;
a cooling chamber, said cooling chamber comprising:
a cooling housing having an inlet port and an outlet port, wherein the working fluid enters the cooling housing inlet port, traverses a distance within the cooling housing, and exits the cooling housing outlet port; and
one or more cooling fins thermally coupled to an exterior surface of the cooling chamber; and
a bypass flow path fluidicly between the cylinder and the cooling chamber, wherein the bypass flow path receives the working fluid directly from within the cylinder from a first side of the piston and provides the working fluid directly to the cooling housing inlet port of the cooling chamber, and receives the working fluid directly from the cooling housing outlet port of the cooling chamber and returns the working fluid directly back to within the cylinder via a second side of the piston.

2. The vehicle suspension damper of claim 1, wherein the bypass flow path comprises
a fluid pathway having the cooling chamber disposed therein, and wherein the fluid pathway is restricted by a check valve that permits fluid flow in a first direction and restricts fluid flow in a second direction.

3. The vehicle suspension damper of claim 2, wherein the check valve is remotely operated by an electronic control module that automatically adjusts a flow rate of working fluid in the bypass flow path based on one or more inputs.

4. The vehicle suspension damper of claim 3, wherein the one or more inputs comprises a vehicle speed input in conjunction with an angular location of a vehicle steering wheel.

5. The vehicle suspension damper of claim 3, wherein the one or more inputs comprises at least one measurement from an accelerometer coupled with at least one part of a vehicle suspension.

6. The vehicle suspension damper of claim 3, wherein the one or more inputs comprises an input from a pressure transducer monitoring a pressure of at least one tire.

7. The vehicle suspension damper of claim 3, wherein the one or more inputs comprises an input from a breaking pressure sensor.

8. The vehicle suspension damper of claim 3, wherein the one or more inputs comprises an input from a gyroscopic mechanism monitoring a trajectory of the vehicle.

9. The vehicle suspension damper of claim 2, wherein the check valve is remotely operated by a wireless signal selected from the group of wireless signals consisting of: a radio frequency signal, a Bluetooth signal, a WiFi signal, and an Antennae signal.

10. The vehicle suspension damper of claim 1, wherein a length of the cooling housing is pre-defined based upon a heat transfer requirement for said vehicle suspension damper.

11. The vehicle suspension damper of claim 1, wherein the working fluid enters the cooling housing inlet port during a rebound stroke of the piston.

12. The vehicle suspension damper of claim 1, wherein the working fluid enters the cooling housing inlet port during a compression stroke of the piston.

* * * * *